(12) United States Patent
Weckesser et al.

(10) Patent No.: US 9,988,277 B2
(45) Date of Patent: Jun. 5, 2018

(54) FLUIDIZED BED REACTOR AND METHOD FOR PRODUCING GRANULAR POLYSILICON

(71) Applicant: WACKER CHEMIE AG, Munich (DE)

(72) Inventors: Dirk Weckesser, Mehring (DE); Harald Hertlein, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 221 days.

(21) Appl. No.: 14/888,594

(22) PCT Filed: Apr. 15, 2014

(86) PCT No.: PCT/EP2014/057655
§ 371 (c)(1),
(2) Date: Dec. 18, 2015

(87) PCT Pub. No.: WO2014/177377
PCT Pub. Date: Nov. 6, 2014

(65) Prior Publication Data
US 2016/0236940 A1    Aug. 18, 2016

(30) Foreign Application Priority Data

May 2, 2013   (DE) .................. 10 2013 208 071

(51) Int. Cl.
*C01B 33/03* (2006.01)
*B01J 8/18* (2006.01)
*C01B 33/027* (2006.01)

(52) U.S. Cl.
CPC ............ *C01B 33/03* (2013.01); *B01J 8/1809* (2013.01); *B01J 8/1827* (2013.01); *B01J 8/1872* (2013.01);
(Continued)

(58) Field of Classification Search
CPC ..................................................... C01B 33/03
See application file for complete search history.

(56) References Cited

U.S. PATENT DOCUMENTS 4,786,477 A    11/1988   Yoon et al.
5,037,503 A    8/1991    Kajimoto et al.
(Continued)

FOREIGN PATENT DOCUMENTS

DE    102005042753 A1    3/2007

OTHER PUBLICATIONS

Wippern et al (Characterization of Fluidized Bed Reactors with Gas Tracer Measurements, Chem Eng Comm, vol. 10, 1981, published online Apr. 6, 2007, Abstract retrieved on Jul. 27, 2017 from http://www.tandfonline.com/doi/abs/10.1080/00986448108910942).*

*Primary Examiner* — Melvin C. Mayes
*Assistant Examiner* — Michael Forrest
(74) *Attorney, Agent, or Firm* — Brooks Kushman P.C.

(57) ABSTRACT

Granular polysilicon is produced in a fluidized-bed reactor by fluidizing silicon particles by means of a gas flow in a fluidized bed heated to a temperature of 850-1100° C., adding a silicon-containing reaction gas by means of a nozzle and depositing of silicon on the silicon particles, wherein, in at least 56% of an axially symmetric region around a nozzle opening of the nozzle,
the reaction gas concentration is greater than 75% of the maximum concentration of the reaction gas (10 to 50 mol %),
the fluidized-bed temperature is greater than 95% of the fluidized-bed temperature outside the axially symmetric region (850-1100° C.) and
(Continued)

the solids concentration is greater than 85% of the solids concentration at the edge of the fluidized bed (55 to 90% by volume).

11 Claims, 5 Drawing Sheets

(52) U.S. Cl.
CPC ... *C01B 33/027* (2013.01); *B01J 2208/00017* (2013.01); *B01J 2208/00548* (2013.01); *B01J 2208/00628* (2013.01); *B01J 2208/00663* (2013.01); *B01J 2208/00725* (2013.01); *B01J 2208/00752* (2013.01); *B01J 2208/00761* (2013.01); *B01J 2208/00902* (2013.01); *B01J 2208/065* (2013.01)

(56) References Cited

U.S. PATENT DOCUMENTS

| | | |
|---|---|---|
| 6,007,869 A | 12/1999 | Schreieder et al. |
| 7,927,984 B2 | 4/2011 | Molnar |
| 2008/0241046 A1* | 10/2008 | Hertlein ............... C01B 33/027 423/349 |
| 2008/0299291 A1* | 12/2008 | Weidhaus ............. C01B 33/027 427/8 |
| 2012/0230903 A1 | 9/2012 | Kulkarni et al. |
| 2012/0269686 A1 | 10/2012 | Jung et al. |

* cited by examiner

FLUIDIZED BED REACTOR AND METHOD FOR PRODUCING GRANULAR POLYSILICON

CROSS REFERENCE TO RELATED APPLICATIONS

This application is the U.S. National Phase of PCT Appln. No. PCT/EP2014/057655 filed Apr. 15, 2014, which claims priority to German Application No. 10 2013 208 071.9 filed May 2, 2013, the disclosures of which are incorporated in their entirety by reference herein.

BACKGROUND OF THE INVENTION

1. Field of the Invention

The invention relates to a fluidized bed reactor and a method for producing granular polysilicon.

2. Description of the Related Art

Polycrystalline silicon granules, or polysilicon granules for short, are an alternative to polysilicon produced in the Siemens process. Whereas the polysilicon in the Siemens process is obtained as a cylindrical silicon rod which, before further processing thereof, must be comminuted in a time-consuming and costly manner to what is termed chip poly, and possibly must again be purified, polysilicon granules have bulk material properties and can be used directly as a raw material, e.g., for single crystal production for the photovoltaics and electronics industries.

Polysilicon granules are produced in a fluidized-bed reactor. This is achieved by fluidizing silicon particles by means of a gas flow in a fluidized bed, where the fluidized bed is heated to high temperatures by a heating device. By addition of a silicon-containing reaction gas, a pyrrolysis reaction proceeds at the hot particle surface. In this process, elemental silicon is deposited on the silicon particles and the individual particles grow in diameter. Via regular take off of particles that have grown and addition of smaller silicon particles as seed particles (in the further course of this document termed "seed"), the method can be operated continuously with all of the associated advantages. As silicon-containing reactant gas, silicon-halogen compounds (e.g. chlorosilanes or bromosilanes), monosilane ($SiH_4$), and also mixtures of these gases with hydrogen are described. Such deposition methods and devices for this purpose are known, for example, from U.S. Pat. No. 4,786,477 A.

US 2008299291 A1 describes a fluidized-bed reactor and a method for producing polysilicon granules. The reactor is divided into two zones. The first zone is weakly fluidized using a silicon-free bottom gas. The reaction gas is injected into the following reaction zone. This arrangement is known as a bubble-forming fluidized bed having additional vertical secondary gas injection. Above the reaction gas nozzles, local reaction gas jets form, within which the silicon-containing gas is deposited on seed particles at temperatures between 890 and 1400° C.

It is disclosed that establishing the bottom gas velocity in a ratio to the reaction gas velocity is of critical importance in order to maximize the product quality and the yield of the target product polysilicon granules.

In addition to the velocity ratio, the mass streams of the reactant gases, the temperature, the particle size and the height of the reaction zone must also be established optimally.

Also bubble formation in this context is a critical parameter. In addition, for optimum development of the gas jets, a well-defined geometric arrangement of the nozzle spacings from one another and the spacings of the nozzles from the wall must be selected. The spacing between the nozzles should be selected in such a manner that the ratio of nozzle spacing to nozzle diameter (internal diameter of the nozzle at the site of gas exit into the fluidized bed) is greater than 7.5.

Undesirable byproducts are silicon dust from homogeneous gas-phase deposition, and silicon dust from abrasion and wall deposition.

It is known that the product quality established in the polysilicon product, in particular, also the chlorine content, depend on the process conditions in the fluidized-bed reactor.

U.S. Pat. No. 6,007,869 claims polysilicon granules having a chlorine content of 6-47 ppmw. Owing to the low chlorine content, adverse effects during CZ-pulling, such as poor monocrystal quality, spray effects and formation of corrosive gases, are avoided. For producing the polysilicon granules, a reaction gas temperature of greater than 900° C. and a particle temperature of greater than 1000° C. must be selected.

U.S. Pat. No. 5,037,503 discloses the production of silicon monocrystals using polysilicon granules having a chlorine content of less than 15 ppmw (deposition with trichlorosilane) or a water content of 7.5 ppmw (deposition with silane). When such polysilicon granules are used, no spray effects occur during crystal pulling.

US 2012230903 A1 discloses a fluidized-bed reactor having a gas distributor for gas distribution into the reaction chamber of the reactor, comprising a multiplicity of distributor openings which ensure a fluid-communicating connection between a first gas source, a second gas source and the reaction chamber, wherein the distributor openings each have at least one central opening and one decentralized opening, wherein the decentralized openings are fluid-communicatingly connected only to the first gas source, but not to the second gas source. Deposition of silicon on the reactor wall is said to be avoidable by the reactor described.

In U.S. Pat. No. 7,927,984 B2, a fluidized-bed reactor that is conical in the lower part is disclosed which is distinguished in that the distributor plate in plan view is divided into central nozzle openings for feeding reaction gas. In addition, around the central nozzles, further nozzles are arranged which serve for metering etching gas into the reactor. It is described that there can be a plurality of reaction gas nozzles and that the reaction gas nozzles need not necessarily be arranged in the center.

US 2012269686 A1 discloses a fluidized-bed reactor having a base plate containing gas channels, wherein a multiplicity of gas nozzles are uniformly distributed on the base plate and the base plate is subdivided into a plurality of regions, wherein in each region, in each case the same number of gas nozzles is present. The number of regions can correspond to the number of gas channels.

It is known from the prior art that various parameters must be optimized for a polysilicon granule production method that is improved with respect to product quality. It is desirable to achieve optimum reaction conditions in the reaction zone of the fluidized-bed reactor and to maintain them in a stable manner during the deposition process.

It is known in this context from the prior art that geometric arrangements of the reaction nozzles and fluidizing nozzles play a role for optimizing the gas jets and also the streams of the media and energies supplied to the reactor.

A high reaction gas concentration, a high solids concentration, and a high temperature in the reaction zone should be present simultaneously.

For further optimization it would actually be necessary to know the parameters in the reaction zone and their superimpositions by in-situ measurements. Unfortunately, conventional fluidized-bed reactors for deposition of polysilicon granules do not allow for the possibility of determining the corresponding parameters metrologically. This is due to the fact that the required measurement instruments would not withstand the reaction gas mixture. Secondly, the product quality of the granule particles coming into contact with the internals would be impaired.

The objective of the invention resulted from the problems described.

SUMMARY OF THE INVENTION

The invention is directed to a method for producing granular polysilicon in a fluidized-bed reactor, which comprises fluidization of silicon particles by means of a gas flow in a fluidized bed which is heated to a temperature of 850-1100° C. via a heating device, addition of a silicon-containing reaction gas by means of at least one nozzle and deposition of silicon on the silicon particles, characterized in that, in at least 56% of an axially symmetric region around a nozzle opening of the at least one nozzle
- a reaction gas concentration is greater than 75% of a maximum concentration of the reaction gas (10 to 50 mol %),
- a fluidized-bed temperature is greater than 95% of a fluidized-bed temperature outside the axially symmetric region (850-1100° C.) and
- a solids concentration is greater than 85% of a solids concentration at the edge of the fluidized bed (55 to 90% by volume).

The invention is also directed to a fluidized-bed reactor for producing granular polysilicon, which comprises a container (1) having an inner reactor tube (2) for a fluidized bed having granular polysilicon and a reactor bottom, a heating device (5) for heating the fluidized bed in the inner reactor tube (2), at least one bottom gas nozzle (19) for feeding fluidizing gas, and at least one reaction gas nozzle (20) for feeding reaction gas, a device (9) for removing reactor off-gas, an off-gas conduit in which a gas chromatograph (10) is situated, a pyrometer (18) for determining the fluidized-bed temperature, a feed appliance (11) in order to feed silicon particles and also a take-off conduit (14) for granular polysilicon, wherein a spacing y between a reactor wall and a closest spaced reaction gas nozzle (20) satisfies the relationship $1.5r<y<2.5r$, wherein r is the maximum radius of the axially symmetric region around a nozzle opening.

DETAILED DESCRIPTION OF THE PREFERRED EMBODIMENTS

The fluidized-bed reactor preferably comprises a plurality of reaction gas nozzles (20) and a spacing x of two adjacent reaction gas nozzles (20) satisfies the following relationship:

$$2r<x<3.2r.$$

Preferably, a control section (16) is situated between the gas chromatograph (10) and the feed appliance (11).

It is likewise preferred if a control section (17) is situated between the gas chromatograph (10) and the heating device (5).

The axially symmetric region around the nozzle opening results from a height of the reaction zone which in turn depends on the bed weight, and also from a diameter of the reactor, and is therefore different from reactor to reactor. In the case of only one central nozzle in the center of the reactor, the maximum extent of the axially symmetric region in a radial direction is given by the reactor diameter. In an axial direction, the extent is given by the height of the reaction zone.

Hereinafter, an explanation is given in detail as to how the axially symmetric region can be determined for each reactor. Firstly, however, some of the terms used in the description will be defined.

"Bed" describes generally a charge of particles in a fluidized-bed reactor.

"Fixed bed" describes a charge of particles in a fluidized-bed reactor which is not in motion.

"Fluidized bed" or "fluidized layer" describes a charge of particles in a fluidized-bed reactor which is fluidized.

"Bed weight" describes the mass of the particle collection fluidized in a fluidized bed.

"Bed height" describes the axial length of the fluidized bed from the fluidizing nozzles to the start of the solids-free freeboard above the fluidized bed.

Preferably, the fluidized-bed reactor comprises a plurality of reaction gas nozzles, wherein a spacing x of two adjacent reaction gas nozzles satisfies the relationship $2r<x<3.2r$, wherein r is the maximum radius of the axially symmetric region around the nozzle opening.

Preferably, a spacing y between a reactor wall and a closest spaced reaction gas nozzle satisfies the following relationship:

$$1.5r<y<2.5r.$$

Preferably, isolines for reaction gas concentration equal to 75% of the maximum concentration of the reaction gas, temperature equal to 95% of the fluidized-bed temperature outside the axially symmetric region and solids concentration equal to 85% of the solids concentration at the edge of the fluidized bed are determined by fluidizing silicon particles by means of a gas flow containing nitrogen in a fluidized bed, adding a gas mixture containing nitrogen and a tracer gas, preferably helium, by means of at least one nozzle, and also measuring solids concentration, tracer gas concentration and temperature distribution in the axially symmetric region of the at least one nozzle by means of measuring probes which are mounted in the reactor interior.

The invention is based on the fact that it is possible to perform the abovementioned measurements in a fluidized-bed reactor without reactive gases. For this purpose, the same gas velocities are established as in the actual deposition process.

Studies with respect to reaction gas concentration distribution are carried out using tracer gases.

In addition, temperature and solids concentration measurements are carried out.

Corresponding measuring methods are available and are described in detail hereinafter.

The measurement results yield the controlled variables of the parameters (volumetric streams bottom gas and reaction gas, reactor heating power) which lead to an optimum production process.

In regions in which not all of the three parameters reaction gas concentration, solid concentration and temperature in the reaction zone assume a maximum possible value, undesirable byproducts form, such as homogeneous silicon dust, for example.

In addition, on the basis of the measurement results, the gas feed can be optimized by exactly defined geometric arrangements of the nozzles and also the design of the base plate. The results directly influence the design of the optimum base plate.

The ideal arrangement of the reactor heater for optimal heat transfer can, in interaction with the fluidization, also be determined.

As a decisive advantage, the method and the apparatus make possible the optimum design of the base plate arrangements for fabricating a fluidized-bed reactor for deposition of polysilicon granules in a bubbling fluidized bed with additional vertical secondary gas injection.

From the results obtained, it is possible for a person skilled in the art to set the velocities of the gases which are injected into the reaction chamber of the reactor via nozzles, the temperature distribution of the reactor heater and the distribution of the solids optimally in order to achieve defined product parameters.

The invention will also be explained hereinafter with reference to the figures.

In the context of this invention, the polysilicon granules are produced using the fluidized-bed method.

Figure 1:
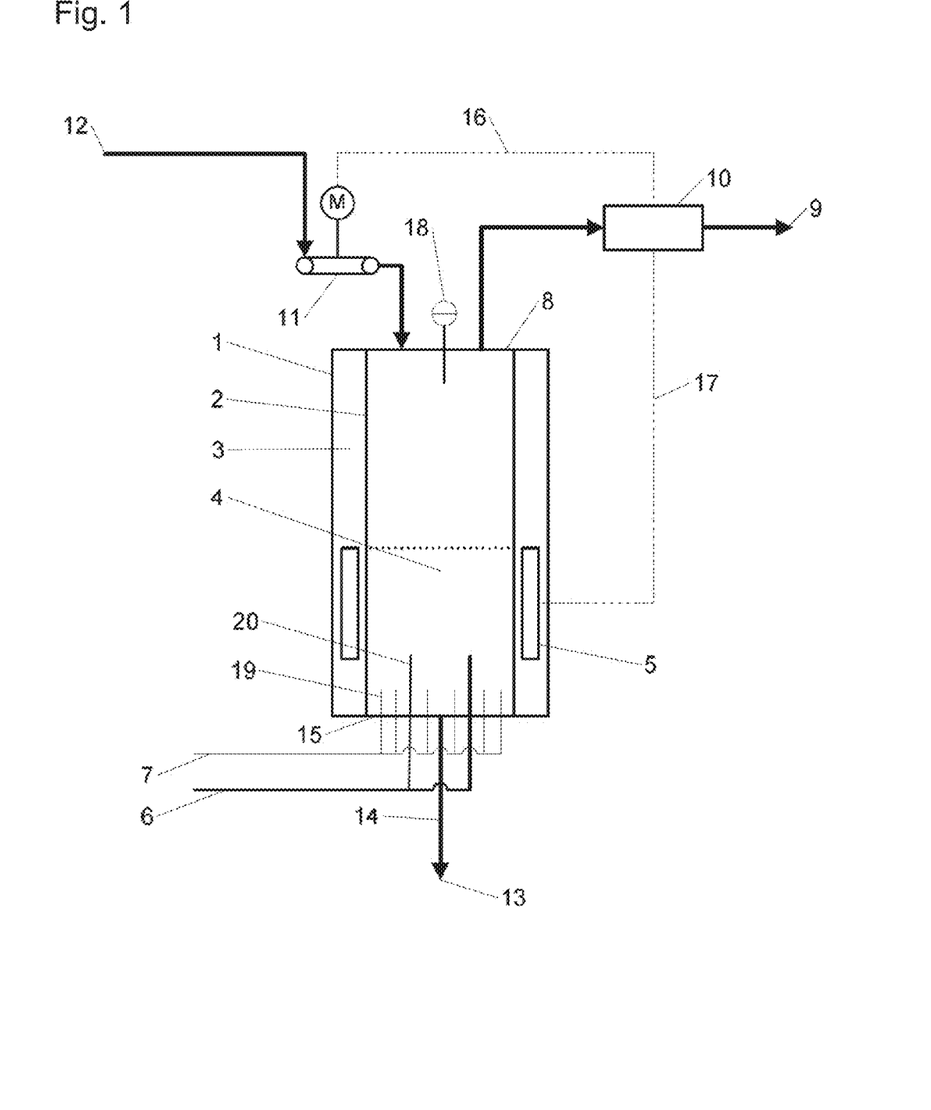
FIG. 1 shows a sketch of the fluidized-bed reactor preferably used in the context of the invention.

FIG. 1 shows a sketch of the fluidized-bed reactor preferably used in the context of the invention.

The fluidized-bed reactor consists of a container 1, into which an inner reactor tube 2 is inserted. An intermediate space 3 is situated between the inner wall of the reactor and the outer wall of the inner tube. The fluidized bed 4 with the polysilicon granules is situated in the interior of the reactor tube. The fluidized bed is heated by means of a heating device 5. The fluidizing gas 7 and the reaction gas mixture 6 are fed as feed gases to the reactor.

The gas feed proceeds in this case in a targeted manner via nozzles. The fluidizing gas 7 is fed via bottom gas nozzles 19 and the reaction gas mixture via what are termed secondary gas nozzles (reaction gas nozzles) 20. The height of the secondary gas nozzles can differ from the height of the bottom gas nozzles.

In the reactor, via the arrangement of the nozzles, a bubbling fluidized bed is formed with additional vertical secondary gas injection.

At the reactor top 8, the reactor off-gas 9 is withdrawn. In the off-gas conduit there is situated a gas chromatograph 10 for online analysis.

A pyrometer 18 for measuring the fluidized bed temperature is mounted at the reactor head 8.

Seed 12 is fed to the reactor at the reactor top via a seed feeding appliance 11.

The polysilicon granules product 13 is withdrawn via a withdrawal conduit 14 at the reactor bottom 15.

There is a control section 16 between the gas chromatograph 10 and the seed feeding appliance. There is a further control section 17 between the gas chromatograph and the reactor heater.

A method for producing polycrystalline silicon granules in a fluidized-bed reactor, which comprises fluidization of silicon seed particles by means of a gas flow in a fluidized bed which is heated by means of a heating device, wherein, by addition of a silicon-containing reaction gas, by means of pyrolysis elemental silicon is deposited on the hot seed particle surfaces, whereby the polycrystalline silicon granules are formed, may be operated continuously by removing from the reactor particles which have grown in diameter by deposition and adding fresh seed particles.

The temperature of the fluidized bed in the reaction region is preferably from 850° C. to 1100° C., more preferably from 900° C. to 1050° C., and most preferably from 920° C. to 970° C.

Preferably, hydrogen is used for fluidization of the seed particles.

The reaction gas is injected into the fluidized bed via one or more nozzles.

The local gas velocities at the exit of the nozzles are preferably 0.5 to 200 m/s.

The concentration of the silicon-containing reaction gas is preferably 10 mol % to 50 mol %, more preferably 15 mol % to 40 mol %, based on the entire gas amount flowing through the fluidized bed.

The concentration of the silicon-containing reaction gas in the reaction gas nozzles is preferably 20 mol % to 80 mol %, more preferably 30 mol % to 60 mol %, based on the entire gas amount flowing through the reaction gas nozzles.

The reactor pressure ranges from 0 to 7 bar gauge, preferably 0.5 to 4.5 bar gauge.

In the case of a reactor having a diameter of, e.g., 400 mm, the mass stream of trichlorosilane is preferably 200 to 400 kg/h.

The hydrogen volumetric stream is preferably 100 to 300 m$^3$ (STP)/h.

For larger reactors, higher amounts of TCS and H$_2$ are preferred.

It is clear to one skilled in the art that some process parameters are ideally selected depending on the reactor size.

Reactor heating power, seed particle metering rate and the bed weight are also preferably higher than the abovementioned values in the case of larger reactors, e.g. in the case of a reactor of 800 mm in diameter.

In order to explain this clearly, hereinafter the ranges of the operating data standardized to the reactor cross sectional area are compiled, in which the method described in the context of this invention is valid.

The specific mass stream of trichlorosilane is preferably 1600-5500 kg/(h×m$^2$).

The specific hydrogen volumetric stream is preferably 800-4000 m$^3$(STP)/(h×m$^2$).

The specific bed weight is preferably 800-2000 kg/m$^2$.

The specific seed particle metering rate is preferably 8-25 kg/(h×m$^2$).

The specific reactor heating power is preferably 800-3000 kW/m$^2$.

The mean diameter of the seed particles is preferably at least 400 μm.

The polycrystalline silicon granules have particle sizes of 150-10 000 μm, wherein a mass-specific median value of a particle size distribution is 850-2000 μm.

The residence time of the reaction gas in the fluidized bed is preferably 0.1 to 10 s, particularly preferably 0.2-5 s.

Measurement Methods

In order to be able to carry out measurements for determining the solids concentration, the tracer gas concentration and the temperature distribution with the reactor described in FIG. 1, the reactor is operated not with the reactive gases usually used for the deposition of polysilicon, but with nitrogen. Alternatively, it can also be operated using filtered air, if sufficient reactor purging takes place thereafter.

The measurements are carried out using invasive measurement probes. For this purpose the reactor section which is used during the deposition process is replaced by a special reactor section.

In this process the various probes are fastened in steel pipes and they are shifted horizontally and vertically in the system by means of adjustment units.

In this manner it is possible to record a 2- or else 3-dimensional profile of the jets. In the context of these studies, preferably the 2-dimensional representation is used.

Invasive methods affect the two-phase flow and must therefore be used with reservations. Care must be taken to ensure that the flow can form completely below the probe and is not deflected by probes situated further below.

In the jet region, a grid of experimental points is recorded. The grid is stretched through a right-angled surface. In this surface, the radius of the reactor is the vector of the horizontal side. In the vertical direction the surface is defined by the vector of the reactor axis.

Tracer Gas Measurements

As tracer gas, helium is used which characterizes the spread of the reaction gas in the measurement.

For determination of the helium concentration, a mixture is withdrawn from the reactor chamber via capillary probes.

The helium concentration is then determined using a mass spectrometer.

In order to be able to determine the distribution of the helium over the cross section of the fluidized bed, gas is withdrawn using a measuring probe at a plurality of radial positions between reactor wall and reactor center and analyzed using the mass spectrometer.

For each measurement position, the measured intensity $c$ is related to the mean cross sectional intensity $c_m$.

The cross section is subdivided in this case into concentric ring surfaces.

For the evaluations, the area-normed helium concentration $c/c_m$ is used.

Temperature Measurement

For the temperature measurement, NiCr/Ni thermocouples which are fitted into a metal tube are used.

For the evaluation, the dimensionless plot of the ratio of the temperature T measured at the respective position to the temperature of the fluidized bed outside the jet, which is quasi equivalent to a maximum temperature $T_{max}$ is used ($T/T_{max}$). When the temperature ratios are formed, the absolute temperature scale in Kelvin is used.

Solids Concentration Measurement

The solids concentration distribution in the reactor is determined using capacitative measuring probes.

The capacitative measurement is based on the dielectric properties of the various phases. For determination of the respective phase fractions, the capacity of a defined volume is measured.

The dielectric constant of the fluid phase typically differs from that of the solid which makes it possible to conclude the volume fractions in the measured volume from a measured dielectricity.

The volume fraction of the solid, or solids concentration for short, is denoted by $(1-\in)$, wherein $\in$ is the porosity.

Before the start of the measurements, the capacitative measuring probe must be calibrated.

For the evaluation, a dimensionless representation is selected.

The ratio of measured solids concentration at a defined position $(1-\in)$ to the solids concentration at the edge of the fluidized bed $(1-\in)_R$ is formed.

Evaluation of the Measurement Results

To discover an optimum reaction range and the settings of the gas jets to be established thereby requires an evaluation method which permits all three measurement methods (tracer gas measurement, temperature measurement and solids concentration measurement) to be considered in parallel with one another.

In the studies on axial and radial jet expansion, the jet dimensions are considered for different velocity ratios of inflowing secondary gas and bottom gas.

The parameters varied are the gas velocity of the bottom gas nozzles $u_B$ and the gas velocity of the secondary gas nozzles $u_R$.

From the measurements, the following data are obtained:
area-normed helium concentration $c/c_m$ as a function of the radial distance to the nozzle opening and the axial height above the reaction gas nozzle
dimensionless temperature $T/T_{max}$ as a function of the radial distance to the nozzle opening and the axial height above the reaction gas nozzle
dimensionless solids concentration $(1-\in)/(1-\in)_R$ as a function of the radial distance to the nozzle opening and the axial height above the reaction gas nozzle.

The axial expansion is determined by reference to limiting criteria and plotted against the dimensionless radius. To establish the limiting concentrations and/or the limiting temperature, a worst-case scenario for the process is assumed, that is to say the criteria applied take into account the most unfavorable conditions. In the case of the chemical reaction, not only high solids concentrations, but also high secondary gas concentrations, and a high temperature are to be present in the reaction zone.

Since the helium concentration outside the jet does not fall off abruptly to the ambient concentration, a concentration limit must be introduced. In a chemical fluidized-bed reactor the decrease in secondary gas concentration is caused by two processes. Dispersion dilutes the reaction gas in the fluid phase of the fluidized bed, whereas in the chemical reaction, it is simultaneously reacted to completion and thus the concentration falls. Because inert gas is used as secondary gas when carrying out the measurements, no chemical reaction takes place. The tracer gas concentration is affected solely by flow phenomena. It is therefore appropriate to set the limiting concentration for determining the radial jet expansion far higher than the ambient concentration.

The limiting concentration for helium based on the maximum concentration is established at 25% of the highest concentration, since the concentration proves to be sufficiently high even in chemical reactions. On the left-hand side in FIG. 2, there is accordingly the region of the reactor on which 75% of the tracer gas is distributed. Separated therefrom by the limiting line, on the right-hand side the region in the reactor having concentrations less than 25% is found.

For establishing the temperature limit, other measures must be applied than is the case for the helium concentration.

For a majority of the applications, the fluidized bed is heated in the hot wall process. In this case the temperature of the secondary gas during charging is below the reaction temperature in order to avoid undesirable side reactions in the feed line. This means that during charging, the nozzle gas must be brought to reaction temperature first by the fluidized bed, as a result of which the temperature is decreased in the jet region.

Firstly, a reduction in temperature below the temperature required for the reaction directly above the nozzle opening at which the solids concentrations are below 10% is advantageous, since an undesirable homogeneous gas phase reaction is decreased.

Secondly, the formation of a low temperature gap for a reactive region as large as possible is important. Since the temperature equilibration in the fluidized bed is completed very rapidly, a temperature limit as high as possible is to be adopted.

The limiting criterion for the temperature is 95% of the fluidized bed temperature outside the jet $T_{max}$.

The limit line thus separates the region in which the temperatures are below 95% of the fluidized-bed temperature $T_{max}$ from the zone of the reactor in which higher temperatures are present.

From the viewpoint of the chemical process, a rapid mixing of solids into the secondary gas, the reaction gas in this case, is desirable.

The solids concentration limit is therefore established at 85% of the solids concentration at the edge $(1-\in)_R$.

In a typical diagram, the radial distance from the nozzle opening is plotted on the x axis and the axial position above the reaction gas nozzle is plotted on the y axis. From the measurement results and the derived limiting criteria, isolines are drawn in for the tracer gas concentration of 25%, for the temperature of 95%, and for the solids concentration of 85%. The isolines define delimited areas. The ratio of these areas to one another and to the area of the measurement region studied is used for the evaluation of what velocity combination and what geometric configuration of the base plate are to be preferred.

Figure 2:
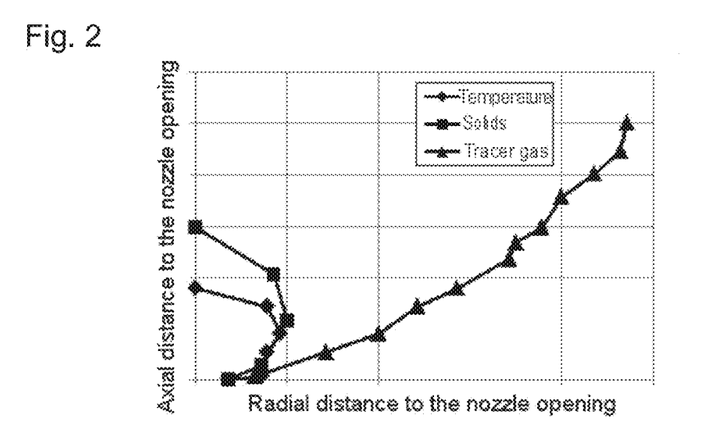
FIG. 2, the structure of isolines from experimental data points when only one reaction gas nozzle is present is shown.

In FIG. 2, by way of example, the structure of the isolines from the experimental data points when only one reaction gas nozzle is present is shown.

Determination of the Chlorine Content

The chlorine content is determined in the bulk of the polysilicon by instrumental neutron activation analysis (INAA) (SEMI PV10).

The chlorine content in the bulk is measured in the unit "ppmw".

A measurement using RFA is also possible.

Determination of the Dust Concentration from Homogeneous Gas Phase Deposition

The dust concentration on the polysilicon granules produced is determined by placing a product sample of the granules into a sieve for measurement, separating off the fine dust particles from the bulk material completely by means of a fluid and forming a suspension in the fluid and transporting the suspension containing the detached fine dust particles continuously by means of a pump to a particle measuring instrument, measuring them there and then returning them to the sample.

Determination of the Deposition Rate

The deposition rate is calculated as net deposition rate via a mass balance. The net deposition rate is the take-off rate minus the seed metering rate. The deposition rate is therefore calculated by determining the mass of the poly-granule charges taken off from the reactor and by determining the mass of the poly-granule charges fed to the reactor as seed.

Studies at the Jet of an Individual Nozzle

For the design of the optimum process, firstly the individual nozzle in a fluidized-bed reactor is considered.

As boundary conditions, in all examples studied, the same mass streams of reaction gas and fluidizing gas were used. In addition, the nozzle exit diameters were kept constant. The results obtained are also applicable to differing mass streams and nozzle diameters, and therefore normalized values are employed.

The relationships and definitions in the jet region are described with reference to FIG. 3.

The reaction gas flows out of the nozzle via the nozzle opening. The bottom gas is added via the fluidization nozzles. The bottom gas can be added via a distributor plate, a sinter plate or via a plurality of individual nozzles arranged evenly distributed. The bottom gas, in the jet region shown, is already completely and uniformly distributed with the corresponding superficial gas velocity over the entire reactor cross section. Therefore, it is irrelevant in what way the bottom gas is added. Both gases form a bubbling fluidized bed with additional vertical secondary gas injection.

In the jet region shown, in the y direction, the axial spacing from the nozzle opening is plotted, and in the x direction the radial spacing from the nozzle opening.

Owing to the conditions at the gas jet, isolines for temperature $L_T$, solids concentration $L_{1-\in}$ and reaction gas $L_G$ form.

What is shown is the right-hand half of a symmetrical profile.

The axis of symmetry represents the horizontal center of the reaction gas nozzle.

Between the line of symmetry and the isoline $L_T$, an area is delimited: in this area, the temperature is less than 5% of the fluidized-bed temperature outside the jet. On the right of the isoline $L_T$, the temperature is above 95% of the fluidized-bed temperature outside the jet.

Similarly, between the line of symmetry and the isoline of the solids concentration $L_{1-\in}$ an area is delimited: in this area, the solids concentration is less than 15% of the solids concentration at the rim of the fluidized bed. On the right-hand side of the isoline $L_{1-\in}$ the solids concentration is more than 85% of the solids concentration at the rim.

In the same manner, between the line of symmetry and the isoline of the reaction gas $L_G$, an area is delimited: in this area the reaction gas concentration is more than 75% of the maximum concentration. On the right of the isoline $L_G$, the reaction gas concentration is less than 25% of the maximum concentration.

The line of symmetry and the isolines $L_T$ and/or $L_{1-\in}$ delimit two areas which are designated by $A_T$ and $A_{1-\in}$.

In the context of further procedure, the smaller area of these two areas is used.

The section which is formed by the point of intersection of the isoline of the smaller area with the line of symmetry and the nozzle opening is $h_T$. In FIG. 3, by way of example, it represents the depth of penetration of the temperature jet.

This section is doubled upwards ($2 \cdot h_T$). Then, a horizontal line L1 is drawn to the right.

At the point of intersection S1 of the horizontal with the isoline $L_G$, a vertical line L2 is drawn downwards.

A point of intersection S2 with the line L2 is formed by a horizontal line r proceeding from the nozzle opening.

In this manner a rectangle having side lengths ($2 \cdot h_T$) and r is defined which has an area $A_{ges}$.

The area decisive for the optimum reaction procedure is $A_R$. This area can be calculated readily from the geometric data.

The area can be calculated from the graphics with the isolines, keeping to the above described procedure, by approximation to a polygon according to the Gaussian trapezoidal formula. It is bounded at the top by L1, at the right and at the bottom by $L_G$ and at the left by the line of symmetry and the line of the two isolines $L_T$ and $L_{1-\epsilon}$ situated further to the right.

Within the area $A_R$ there is a high temperature with simultaneous presence of a high solids concentration and a high reaction gas concentration.

It has surprisingly been found as the result of a multiplicity of measurements that an optimum reaction profile may only be expected when $$A_R > 0.56 \cdot A_{ges}.$$

Furthermore, it proves to be advantageous when the areas satisfy the condition $$\frac{|A_T - A_{1-\varepsilon}|}{A_T} \leq 0.1.$$

Figure 3:
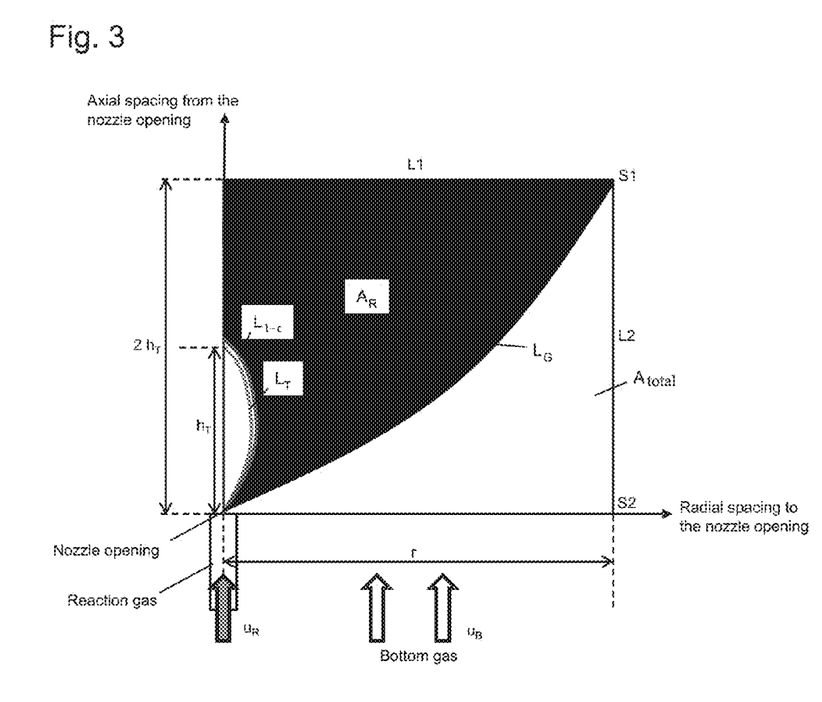
FIG. 3 describes relationships within the jet region.

This case represents the example according to the invention in FIG. 3. The case was achieved by the velocity of the bottom gas being $u_G=0.6$ m/s and the velocity of the reaction gas being $u_R=75$ m/s. In a reactor 400 mm in diameter, a deposition rate of 12 kg/h of polysilicon granules was achieved. The dust formation by homogeneous gas-phase deposition was <2% in this case. In the product, chlorine contents of 20 ppmw were achieved.

Figure 4:
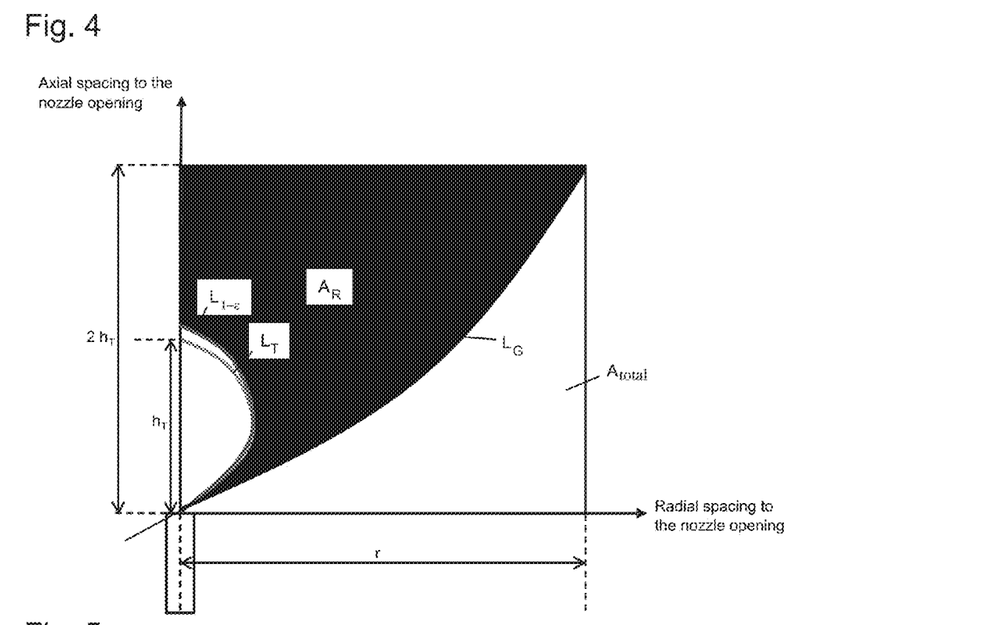
FIG. 4 illustrates comparative process parameters.

In contrast to the optimum reaction profile, as a comparative example the scenario shown in FIG. 4 was obtained. Here, the velocity of the bottom gas is $u_G=0.7$ m/s and the velocity of the reaction gas is $u_R=80$ m/s. The area $A_R$ is markedly smaller than the area from the example according to the invention ($A_R<0.56 \cdot A_{ges}$). The region having optimum reaction conditions is therefore made smaller. The cause thereof is the deviating isolines at the gas jet which are caused by the differing velocities. In a reactor 400 mm in diameter, a deposition rate of 10 kg/h of polysilicon was achieved. The dust formation by homogeneous gas-phase deposition was <2% in this case. In the product, chlorine contents of 25 ppmw were achieved. The cause of the lower deposition rate and the higher chlorine contents is that a smaller region having high supersaturations, which leads to rapid particle growth, is present.

Figure 5:
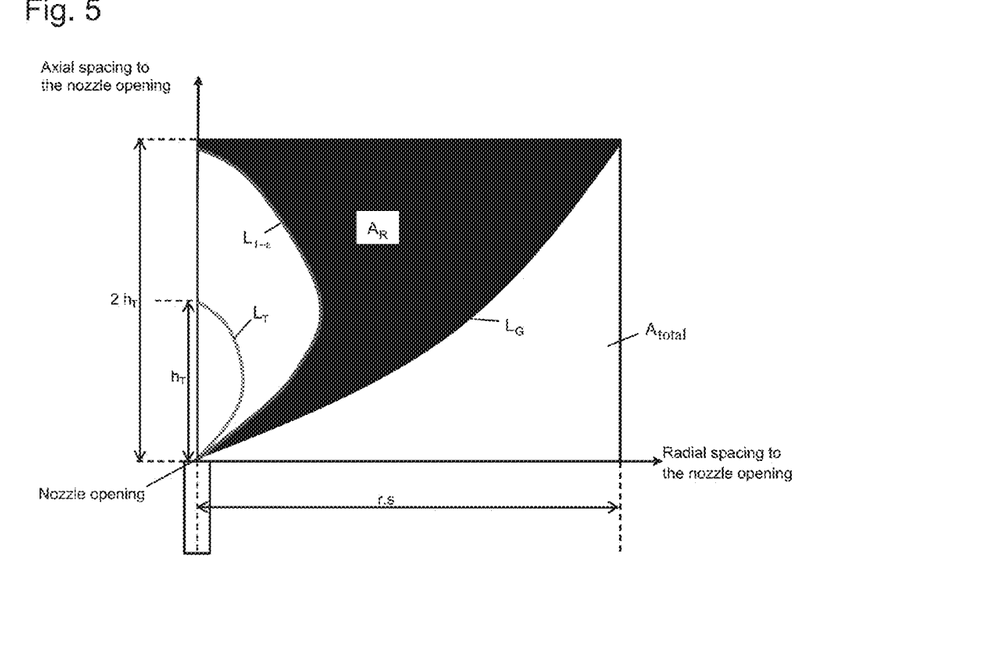
FIG. 5 illustrates process parameters of a further comparative example.

A further comparative example is shown in FIG. 5. Here, the velocity of the bottom gas is $u_G=0.8$ m/s and the velocity of the reaction gas is $u_R=130$ m/s.

In a reactor 400 mm in diameter, a deposition rate of 7.5 kg/h of polysilicon was achieved. The dust formation due to homogeneous gas-phase deposition was >20% in this case. In the product, chlorine contents of 38 ppmw were achieved.

The area $A_R$ in this example is extraordinarily small. A further disadvantage of this scenario is the very different position of the isoline $L_T$ and the isoline $L_{1-\epsilon}$. When the isoline $L_{1-\epsilon}$ is further to the right than the isoline $L_T$, a region is formed in which, although a high reaction gas concentration and a high temperature are present, an insufficient solids concentration must be recorded. The consequence is that the fraction of homogeneous gas-phase deposition in the total reaction increases. The high supersaturation cannot be reduced by growth on solid particle seeds.

Figure 6:
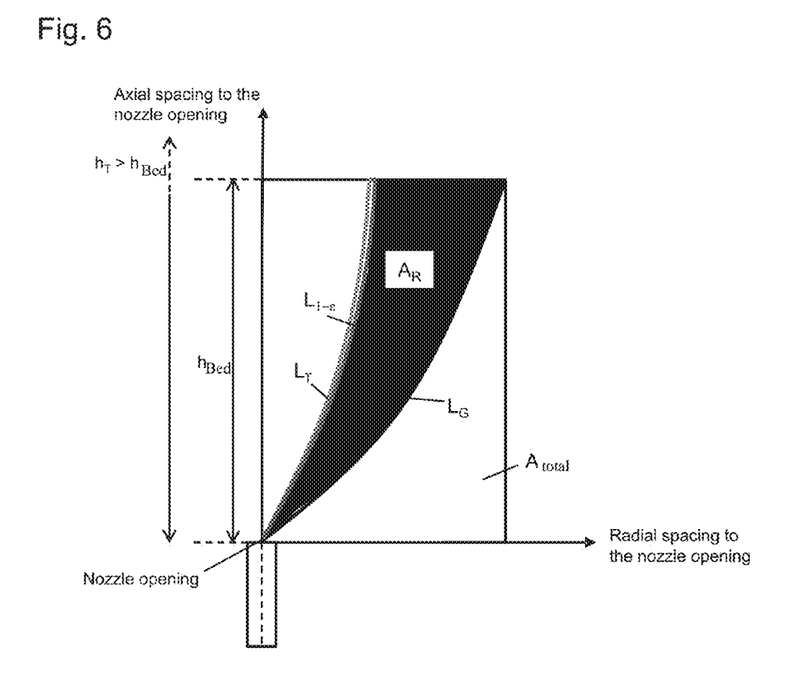
FIG. 6 illustrates process parameters of a further comparative example.

A further comparative example is shown in FIG. 6. Here, the velocity of the bottom gas is $u_G=0.3$ m/s and the velocity of the reaction gas is $u_R=130$ m/s. A spouted fluidized bed is present. In a reactor 400 mm in diameter, a deposition rate of 8 kg/h of polysilicon was achieved. The dust formation due to homogeneous gas-phase deposition was <10% in this case. Chlorine contents of 35 ppmw were achieved in the product.

All three isolines breach the bed height of the fluidized bed $h_{bed}$. Above the nozzle, a solids-free and cold region forms in which no reaction takes place. On account of the low bottom gas velocities, the movement of the particles migrating downwards in the edge region stagnates and local overheating occurs.

Studies on Jets from a Plurality of Nozzles

The capacity of a fluidized-bed reactor having a defined reactor inner diameter for deposition of polysilicon granules is dependent on various boundary conditions.

An important parameter is the mass stream of silicon-containing reaction gas fed to the reactor. In order to keep the conditions at the gas jet of a reaction gas nozzle constant in comparison to the individual nozzle, the capacity cannot be increased by increasing the mass stream at an individual nozzle. Also, it is not directly possible to enlarge the nozzle exit diameter and to increase the mass stream, since this leads to large bubbles.

A plurality of individual nozzles must be built into the reactor bottom which all have conditions at the gas jet as identical as possible. The capacity is therefore limited by how tightly the nozzles can be arranged.

In this process, as few as possible interactions between the nozzles and between the nozzles and the reactor wall should occur.

If a strong interaction between the jet regions of two nozzles should take place, this could lead to a great spreading of the temperature gaps and large regions having temperatures below the reaction temperature. Also, regions having an insufficient solids concentration occur, and furthermore, also regions having an insufficient reaction gas concentration.

By means of the measurement methods described above and the evaluation thereof, an optimum arrangement of the reaction gas nozzles on the reactor bottom, and an establishment of the required number of nozzles—when there is a capacity that is to be achieved, and in the case of a defined reactor diameter—is possible.

Similarly to the description of the studies on an individual nozzle, it is not relevant how the bottom gas is fed to the reactor bottom, or how the bottom gas nozzles, the distributor plate or the sinter plate are arranged. The bottom gas, in the jet region shown, is already completely and uniformly distributed over the entire reactor cross section with the corresponding superficial gas velocity. Both gases in the jet region described form a bubbling fluidized bed having an additional vertical secondary gas injection.

Figure 7:
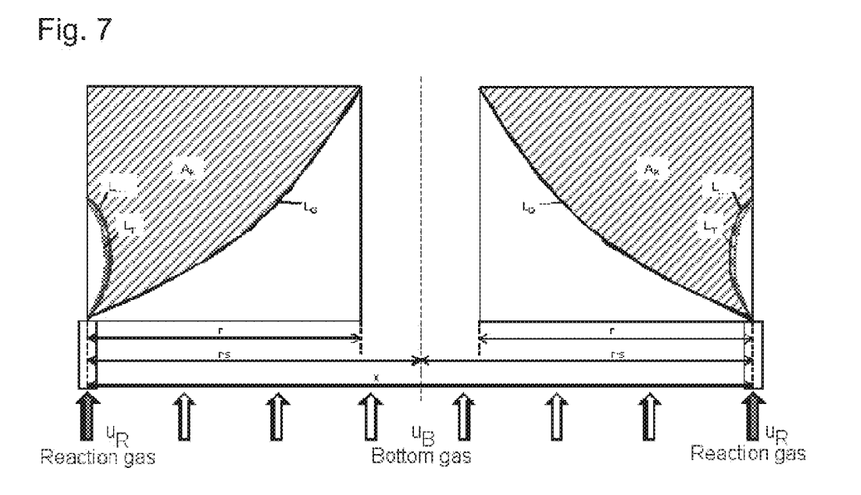
FIG. 7 illustrates inventive parameters for plural nozzles.

In FIG. 7, the case of the example according to the invention is revisited from the studies on an individual nozzle.

Two nozzles are shown which are arranged at a defined spacing x between the nozzle middle points. When a defined radius r around the reaction gas nozzle is present which has been established from the studies on an individual nozzle, it has surprisingly been found that the spacing x must satisfy the following condition in order to exclude interactions between a nozzle and the nearest nozzle thereto:

$$2 \cdot r \cdot s < x < 2 \cdot r \cdot (s+t),$$

wherein the parameters s and t should typically have values of s=1.0 and t=0.6.

In order to exclude the interactions between nozzles and the reactor wall, the arrangement should be selected in such a manner that the shortest spacing y between the wall and the nozzle nearest the wall meets the following condition:

$$r \cdot s < y < r \cdot (s+t),$$

wherein the parameters s and t should typically have values of s=1.5 and t=1.0.

Preferred Embodiments of the Base Plates

Figure 8:
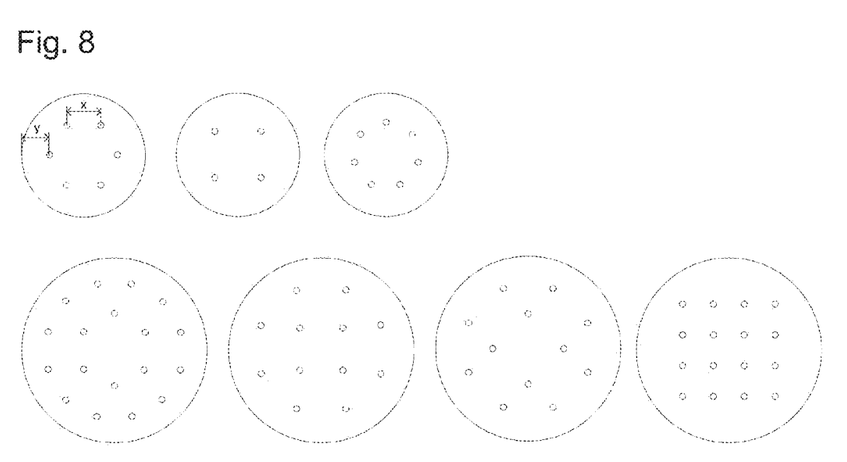
FIG. 8 illustrates a preferred embodiment of a base plate.

FIG. 8 shows preferred embodiments of the base plates, the design of which is yielded by the results of the jet measurements.

The reaction gas nozzles are arranged in such a manner that the above defined conditions are met. For reasons of simplification, possible fluidization nozzles are not shown. It is known to those skilled in the art that they can be implemented by a sinter base, distributor plates or by individual nozzles.

The nozzles in this case can be arranged distributed uniformly on one or more concentric circles running around the reactor middle point, in such a manner that the radial angle between the nozzles on one circle remains constant. In this variant, the solid rollers are uniformly distributed over the reactor volume.

Another preferred possibility is the arrangement of the nozzles to form clusters having at least three individual nozzles and a uniform distribution of these clusters around the reactor middle point.

An advantage of the cluster arrangement is the possibility of a preferred metering of reaction gas mixtures of differing composition (concentration of the chlorosilanes, type of chlorosilanes) via different clusters.

The individual clusters in this case are supplied with a defined reaction gas mixture via a supply port.

A further advantage of the cluster arrangement is the simplified upscaling possibility which is opened up owing to the arrangements that are independent of each other with respect to overlapping and mutually interfering gas jet regions.

The invention claimed is:

1. A method for producing granular polysilicon in a fluidized-bed reactor, comprises fluidizing silicon seed particles by a hydrogen gas flow in a fluidized bed which is heated to a temperature of 850-1100° C., adding trichlorosilane as a silicon-containing reaction gas by means of at least one nozzle, wherein a local gas velocity at an outlet of the at least one nozzle is 0.5 to 200 m/s, and depositing silicon on the silicon seed particles, wherein, relative to the reactor cross sectional area, a specific mass stream of trichlorosilane is 1600-5500 kg/(h×m$^2$), a specific hydrogen volumetric stream is 800-4000 Nm$^3$(STP)/h×m$^2$), a specific bed weight of the fluidized bed is 800-2000 kg/m$^2$, a specific seed particle metering rate is 8-25 kg/(h×m$^2$) and a specific reactor heating power is 800-3000 kW/m$^2$, and wherein the mass stream of trichlorosilane, the hydrogen volumetric stream and the reactor heating power are selected such that in at least 56% of an axially symmetric region around a nozzle opening of the at least one nozzle;

the reaction gas concentration is greater than 75% of a maximum concentration of the reaction gas of 10 to 50 mol %, the fluidized-bed temperature is greater than 95% of a maximum fluidized-bed temperature of 850 to 1100° C.; and the solids concentration is greater than 85% of a maximum solids concentration of the fluidized bed of 55 to 90% by volume;

wherein the axially symmetric region around a nozzle opening is determined as follows:

determining isolines in a jet region, wherein an $L_G$ reaction gas concentration is equal to 75% of the maximum concentration of the reaction gas, and an $L_T$ temperature is equal to 95% of the fluidized-bed temperature outside the jet region, and an $L_{1-\in}$ solids concentration is equal to 85% of the solids concentration at the edge of the fluidized bed;

plotting a representation of the isolines in the jet region, where in the y direction, the axial spacing from the nozzle opening and, and in the x direction, the radial spacing from the nozzle opening are plotted;

determining a minimum axial spacing $h_T$ of nozzle opening from respective points of intersection of the isolines for temperature $L_T$ and solids concentration $L_{1-\in}$ with the line of radial spacing=0, wherein a spacing y between a reactor wall and a closest spaced reaction gas nozzle satisfies the relationship 1.5r<y<2.5r;

defining a maximum radius r of the axially symmetric region as a radial spacing of the nozzle opening from a point of intersection of the isoline $L_G$ with the line of axial spacing=2$h_T$; and a maximum axially symmetric region=r×2$h_T$.

2. The method of claim 1, wherein a plurality of reaction gas nozzles is present.

3. The method of claim 2, wherein a spacing x of two adjacent reaction gas nozzles satisfies the relationship: 2r<x<3.2r.

4. The method of claim 1, wherein the isolines $L_G$ reaction gas concentration equal to 75% of the maximum concentration of the reaction gas, $L_T$ temperature equal to 95% of the fluidized-bed temperature outside the jet region, and $L_{1-\in}$ solids concentration equal to 85% of the solids concentration at the edge of the fluidized bed, are determined by fluidizing silicon particles by means of a gas flow containing nitrogen in a fluidized bed instead of a hydrogen gas flow, adding a gas mixture containing nitrogen and containing helium as a tracer gas, instead of adding trichlorosilane, which characterizes the spread of the reaction gas of at least one nozzle in the measurement and measuring solids concentration, tracer gas concentration and temperature distribution in the axially symmetric region of the at least one nozzle by means of measuring probes which are mounted in the reactor interior, and after determination of the axially symmetric region, producing granular polysilicon.

5. The method of claim 1, wherein particles which have grown in diameter by deposition are removed from the reactor and fresh silicon particles are continuously added.

6. A fluidized-bed reactor for producing granular polysilicon by the method of claim 1, comprising a container having an inner reactor tube for a fluidized bed of granular polysilicon and a reactor bottom, a heating device for heating the fluidized bed in the inner reactor tube, at least one bottom gas nozzle for feeding fluidizing gas, and at least one reaction gas nozzle for feeding reaction gas, a reactor off-gas outlet comprising an off-gas conduit in which a gas chromatograph is situated, at least one pyrometer for determining the fluidized-bed temperature, a silicon particle feeder, a take-off conduit for removing granular polysilicon product, wherein a spacing y between a reactor wall and a closest spaced reaction gas nozzle satisfies the relationship 1.5r<y<2.5r, wherein r is the maximum radius of an axially symmetric region around a nozzle opening, where r is determined as follows: determination of isolines in a jet region:
- an $L_G$ reaction gas concentration equal to 75% of the maximum concentration of the reaction gas,
- an $L_T$ temperature equal to 95% of the fluidized-bed temperature outside the jet region,
- an $L_{1-\in}$ solids concentration equal to 85% of the solids concentration at the edge of the fluidized bed;
- the isolines in the jet region are plotted, where in the y direction, the axial spacing from the nozzle opening and, in the x direction, the radial spacing from the nozzle opening are plotted;
- the minimum axial spacing $h_T$ of the nozzle opening from the respective points of intersection of the isolines for temperature $L_T$ and solids concentration $L_{1--}$ with the line of radial spacing=0 is determined;
- wherein the maximum radius r of the axially symmetric region is defined as a radial spacing of the nozzle opening from a point of intersection of the isoline $L_G$ with the line of axial spacing=$2h_T$.

7. The fluidized-bed reactor of claim 6, wherein the fluidized-bed reactor comprises a plurality of reaction gas nozzles and a spacing x of two adjacent reaction gas nozzles satisfies the following relationship: 2r<x<3.2r.

8. The fluidized-bed reactor of claim 6, wherein a control section is situated between the gas chromatograph and the polysilicon particle feeder, and the control section adjusts a polysilicon particle feed based on chromatographic determined concentration of components in a reactor off-gas.

9. The fluidized-bed reactor of claim 7, wherein a control section is situated between the gas chromatograph and the polysilicon particle feeder, and the control section adjusts a polysilicon particle feed based on chromatographic determined concentration of components in a reactor off-gas.

10. The fluidized-bed reactor of claim 6, wherein a control section is situated between the gas chromatograph and the heating device, and the control section adjusts power to the heating device based on chromatographic determined concentrations of components in a reactor off-gas.

11. The fluidized-bed reactor of claim 7, wherein a control section is situated between the gas chromatograph and the heating device, and the control section adjusts power to the heating device based on chromatographic determined concentrations of components in a reactor off-gas.

* * * * *

UNITED STATES PATENT AND TRADEMARK OFFICE
CERTIFICATE OF CORRECTION

PATENT NO. : 9,988,277 B2
APPLICATION NO. : 14/888594
DATED : June 5, 2018
INVENTOR(S) : Dirk Weckesser et al.

It is certified that error appears in the above-identified patent and that said Letters Patent is hereby corrected as shown below:

In the Claims

Column 15, Line 16, Claim 6:
After "and solids concentration"
Delete "$L_1$ –" and
Insert -- $L_{1-\varepsilon}$ --.

Signed and Sealed this
Ninth Day of October, 2018

Andrei Iancu
*Director of the United States Patent and Trademark Office*